(No Model.) 5 Sheets—Sheet 1.
C. C. CHAMBERLAIN.
MACHINE FOR MAKING CUSPIDORS.
No. 418,888. Patented Jan. 7, 1890.
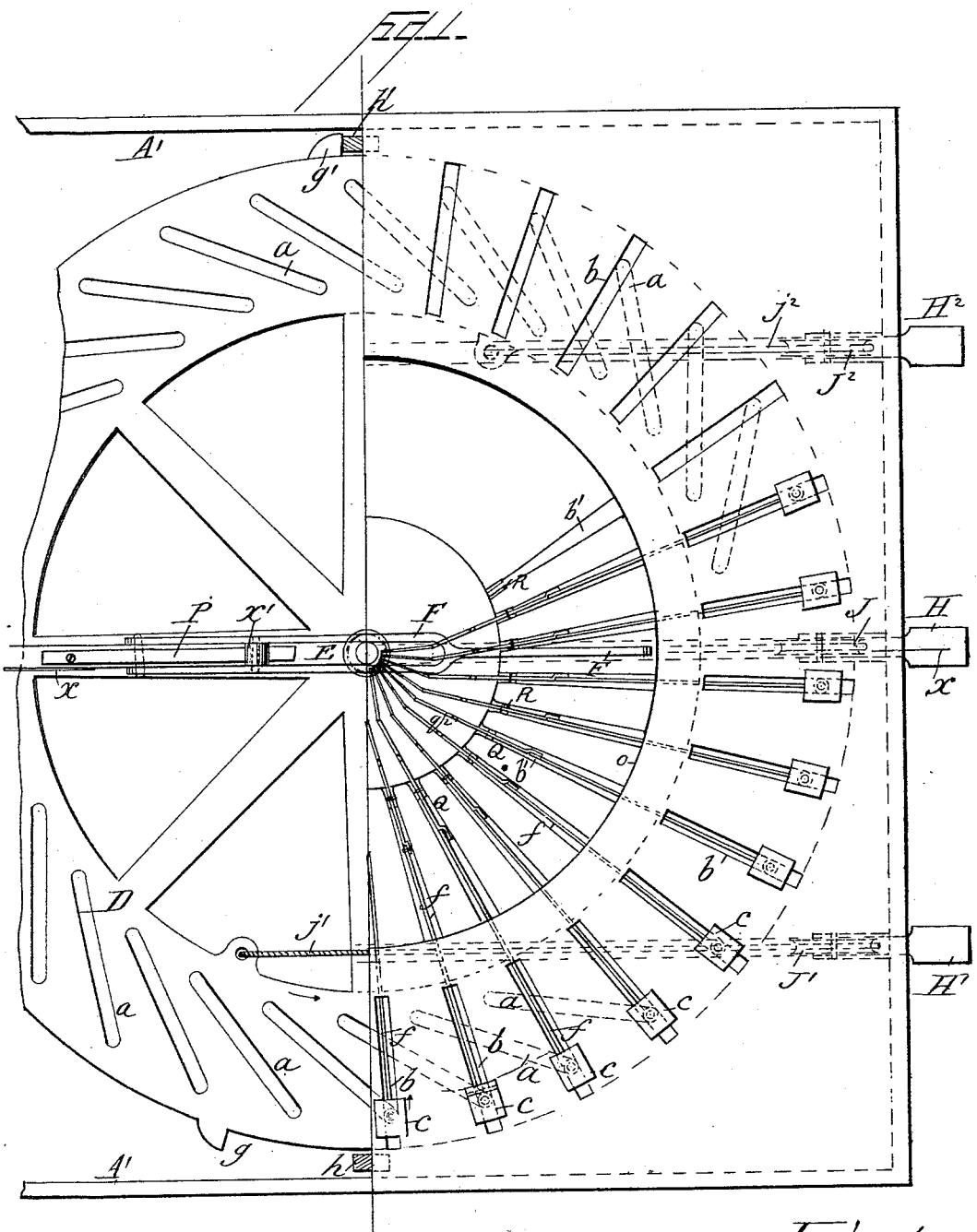
Attest:
F. H. Schott
G. Burroughs
Inventor:
Charles C. Chamberlain
By M. K. Chandler
Atty (No Model.) 5 Sheets—Sheet 2.
C. C. CHAMBERLAIN.
MACHINE FOR MAKING CUSPIDORS.
No. 418,888. Patented Jan. 7, 1890.
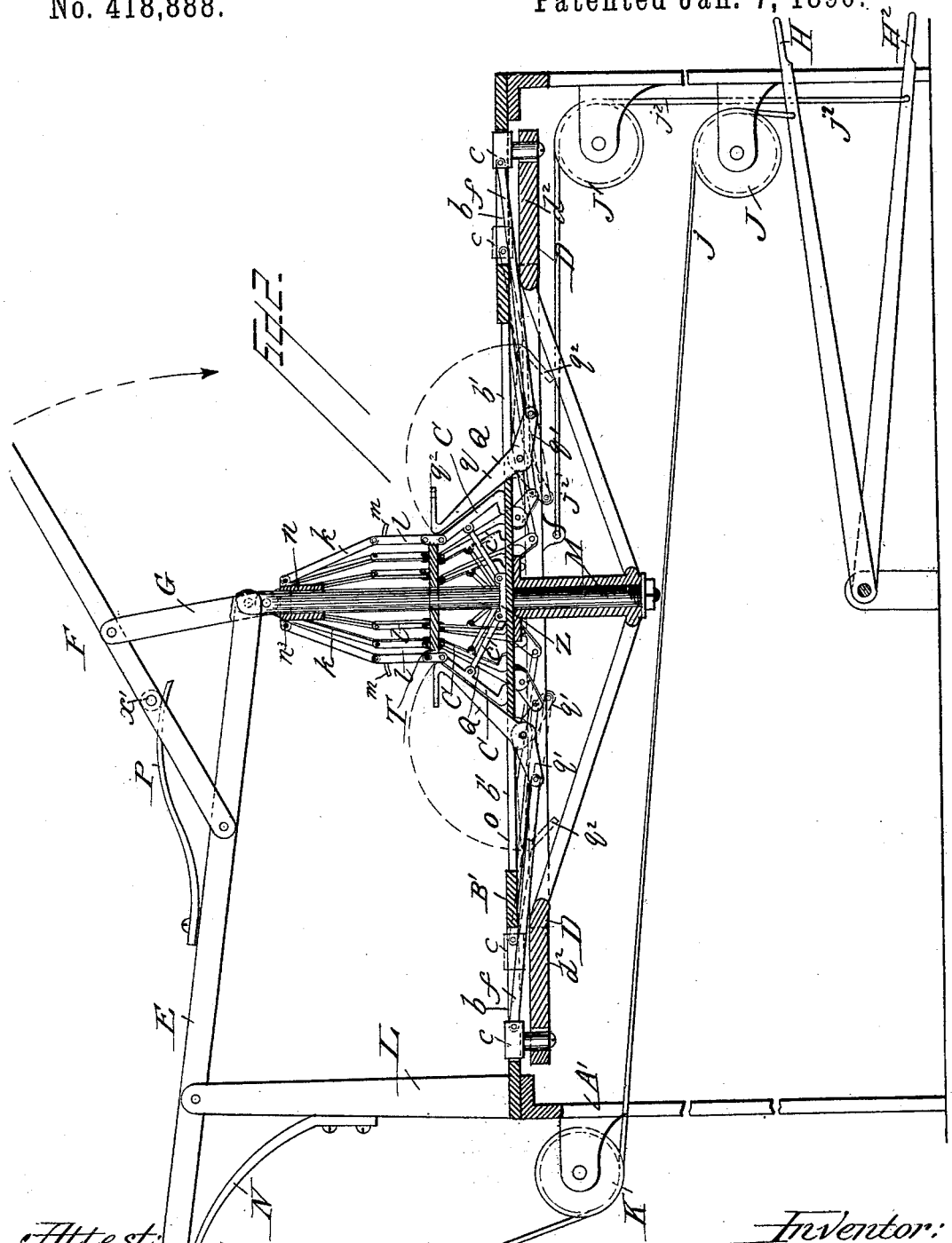
Attest:
F. H. Schott
G. Burroughs
Inventor:
C. C. Chamberlain
By M. F. Chandler
Atty
N. PETERS, Photo-Lithographer, Washington, D. C.

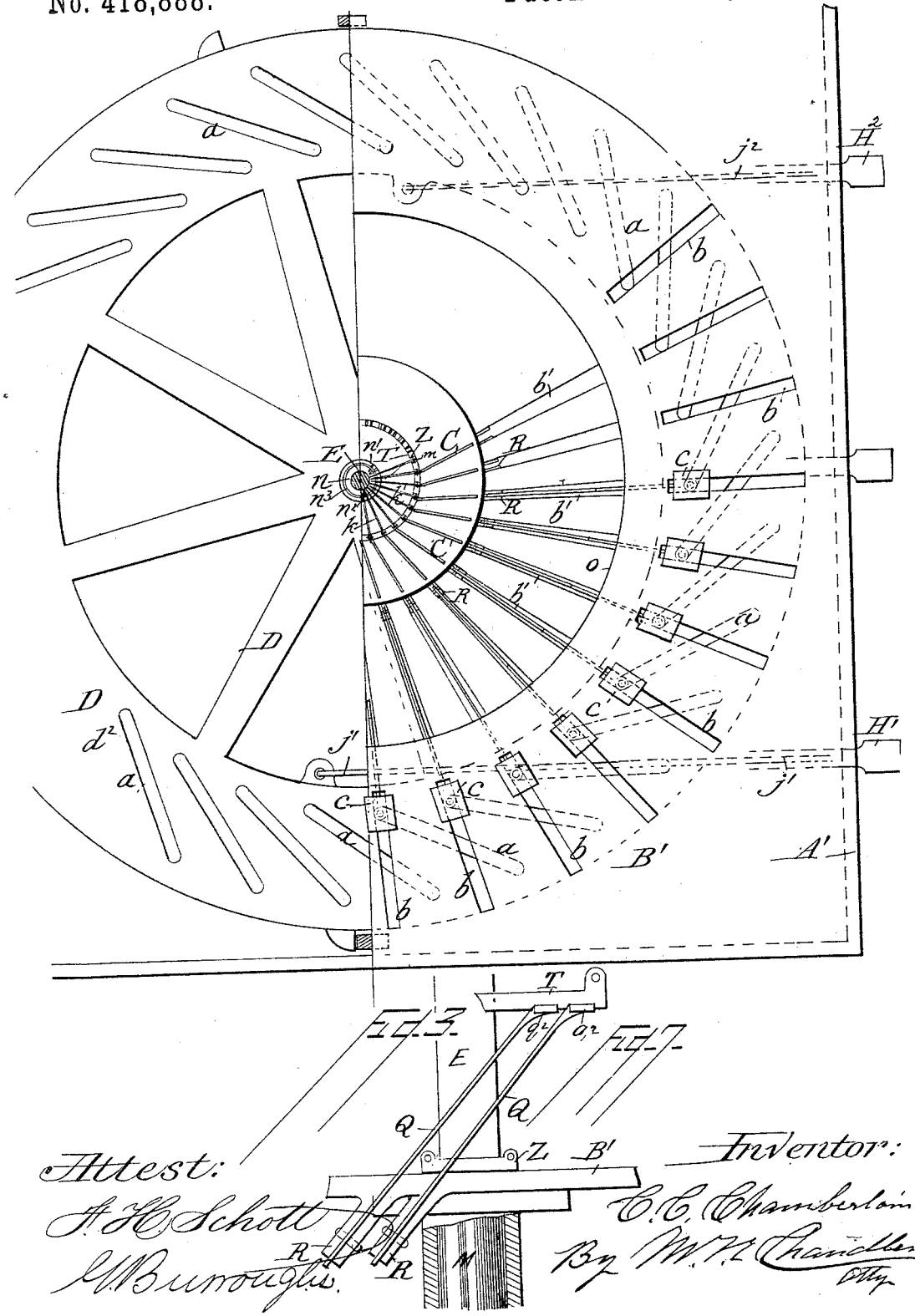

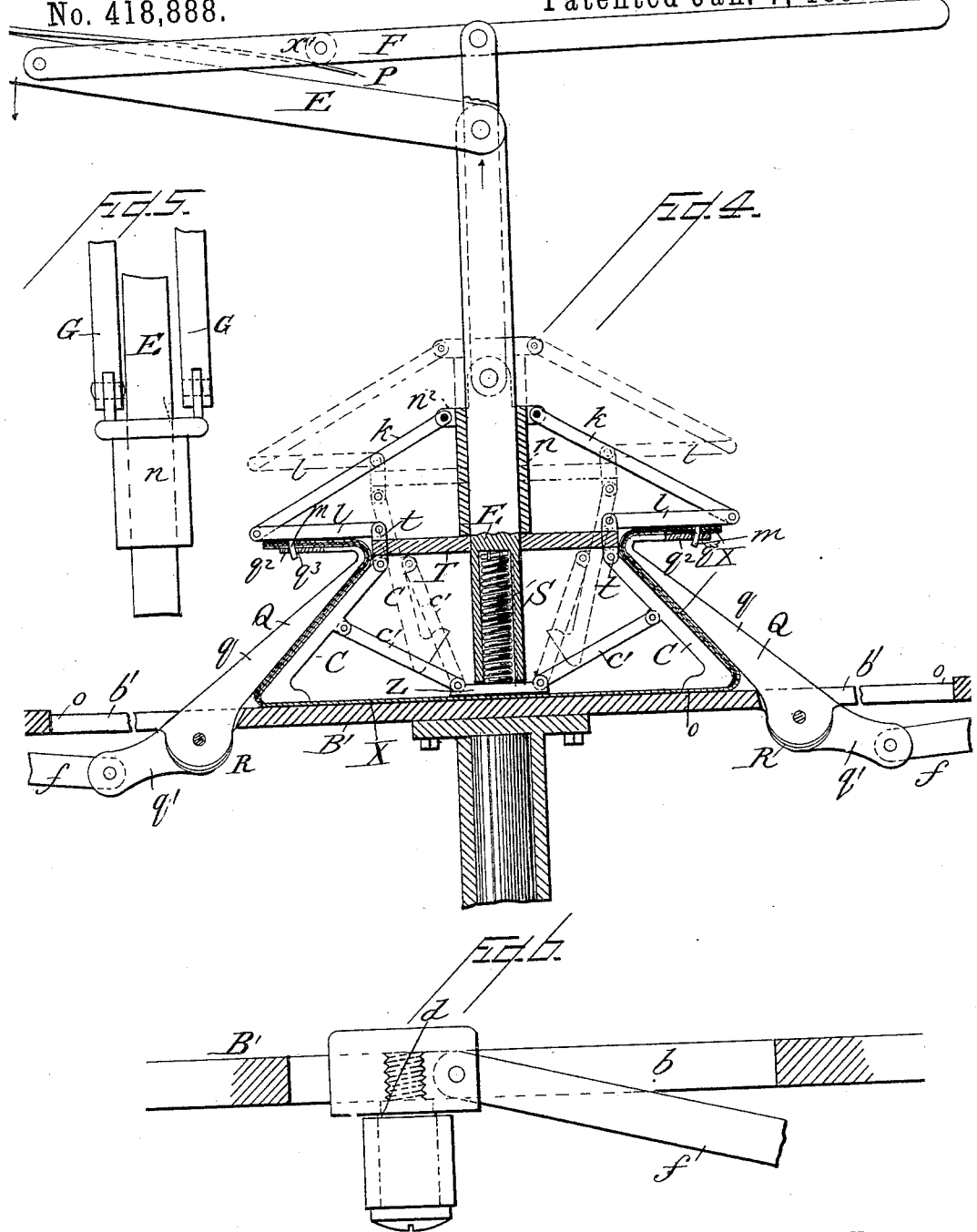

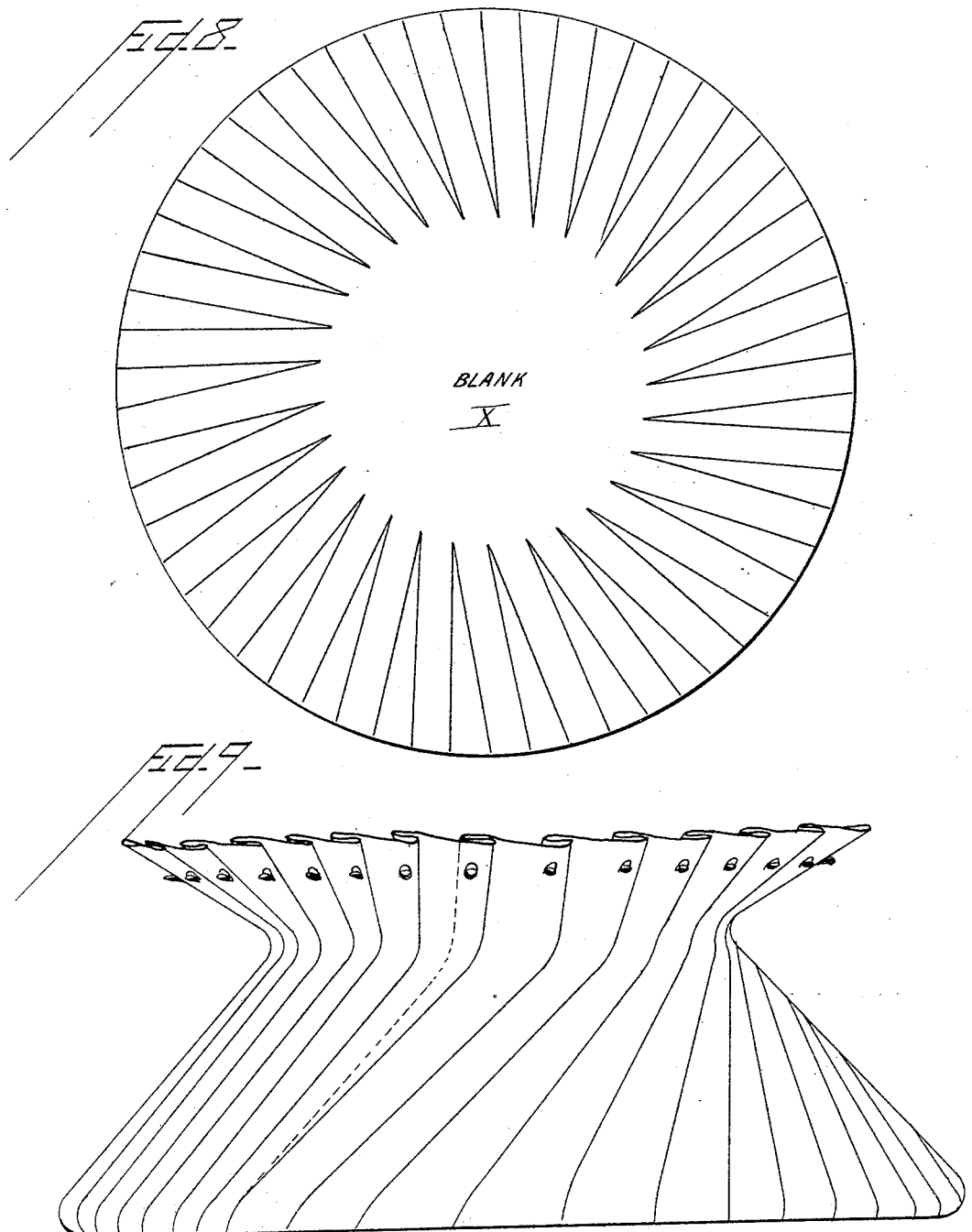

UNITED STATES PATENT OFFICE.

CHARLES C. CHAMBERLAIN, OF MUSKEGON, MICHIGAN.

MACHINE FOR MAKING CUSPIDORS.

SPECIFICATION forming part of Letters Patent No. 418,888, dated January 7, 1890.

Application filed May 25, 1889. Serial No. 312,111. (No model.)

*To all whom it may concern:*

Be it known that I, CHARLES C. CHAMBERLAIN, a citizen of the United States, residing at Muskegon, in the county of Muskegon and State of Michigan, have invented certain new and useful Improvements in Machines for Making Cuspidors; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to machines for making hollow plaited articles of a suitable material—such as sheet metal, paper, pasteboard, &c.—being especially adapted for the manufacture of cuspidors, the object being to render the manufacture thereof so easy and cheap that they may be used for a short period—such as one or two days—and afterward thrown away or burned in a stove without the necessity of washing. When paper is used, it is rendered water-proof, and the period of its use is intended to be about two days.

The invention consists in the construction and novel combination of parts, hereinafter described, illustrated in the accompanying drawings, and pointed out in the appended claims.

Figure 1 represents a plan view, the bed being removed on one side to show the cam-wheel below. Fig. 2 represents a vertical section on the line $x\ x$ of Fig. 1. Fig. 3 is a plan view similar to Fig. 7, showing the cross-heads down into the ends of their slots. Fig. 4 represents a side view of the machine, partly in section, to show the construction more clearly. Fig. 5 is a detail view of the lifting-lever and sleeve. Fig. 6 is an enlarged view showing cross-head at the farther end of slot. Fig. 7 is a detail view of the plaiters. Fig. 8 represents a plan view of a circular scored blank of the cuspidor. Fig. 9 is a side view of the cuspidor complete.

Referring to the drawings by letter, A' represents the main frame of the machine, of general rectangular shape, provided with proper supports or legs, as shown.

B' designates the rectangular horizontal bed-plate or table secured to the top of the main frame. On the center of the bed-plate rests the conical frustum-shaped former composed of a suitable number of bars C, Fig. 4, having the base-plate Z and the top plate T, which is provided around its circumference with the upward and downward projecting lugs $t$. To the lower of these sets of lugs the upper ends of the corresponding bars C of the former are pivoted by a bolt or rivet, as shown. A link-bar $c'$ connects a lug on the inner edge of each former C with a similar lug on the edge of the base-plate Z, which is of small diameter and occupies the central part of the former resting on the bed-plate B'.

E is a lever having a vertical pivoted arm having connected to it the plate T, passing through the plate and resting on the plate Z. The said depending part has a recess extending upward from its end, and contains a coiled spring S, that holds the plate Z down. The outer arm of the lever E is pivoted at a suitable point of its length to a standard L rising from the main frame.

N is a spring secured to said standard and having an anti-friction roller $y$ on its free end, which roller bears upward on the outer portion of the lever and tends to depress the inner portion.

H is a treadle, the shank of which is pivoted upon the main frame at a suitable point.

$j$ is a rope, which passes over the pulley J and under the pulley K, which pulleys are journaled between sets of lugs standing from proper points of the main frame, and has its upper end attached to the outer end of the lever E, so that the workmen by pressing down the treadle H can, by means of said rope, raise the inner end of the lever E against the action of the spring N, and consequently the entire former to which the lever is secured, as described. The former C is thus raised for the purpose of inserting the circular paper blank X, (see Fig. 8,) of which the cuspidor is formed, into the circular recess $o$ in the bed-plate below the former.

Q are the plaiters having the longer upper arms $q$ and the lower perforated shorter arms $q'$, perforated at their ends. The plaiters equal the former-bars C in number and are slightly widened between the arms and pivoted between lugs R, depending from the inner ends of the long narrow slots $b'$ in the bed-plate B', so that the long arms $g$ of the plaiters can be turned outward into said slots below the bed-plate by mechanism hereinafter described. The arms Q of the plaiters have standing outward from their upper ends the arms $q^2$, provided with perforations $q^3$, near the outer end, for the purpose hereinafter explained.

M is a shaft depending from the central bed-plate and having the cam-wheel D mounted upon it, the said wheel being retained in place by washer and nut on the lower threaded end of said shaft. The spokes of the wheel are inclined upward and outward from the lower end of the hub to its circular wide horizontal rim $d^2$, just below the bed-plate, and provided with the long narrow slots $a$, equal in number to the slots $b$ in the bed-plate, and inclined in similar directions across the radii, passing through their centers at equal angles to said radii. $c\ c$ are blocks or cross-heads T-shaped in cross-section to rest and move in the slots $b$ of the bed-plate. Pins $d$ are screwed into and depend from the cross-heads $c$, and have upon them anti-friction rollers which enter and move in the inclined slots $a$ on the cam-wheel D. $f\ f$ are pivoted links that connect the inner ends of the cross-heads with the perforated outer ends of the arms Q of the corresponding plaiters. The arms $q$ of the plaiters are preferably inclined at equal angles laterally (see Fig. 7) as they extend upward on the former—that is, they are not situated in planes passing through the axis of the former, though they may be so constructed when the machine is intended to operate upon sheet metal. This inclination is obtained by having the bearings on which the arms $q$ are pivoted incline to the plane of the bed-plate of the machine. This causes said arms to rise in the manner stated above.

H' and H² are two similar treadles with their shanks pivoted at the inner ends upon the main frame at suitable points. To the said treadles are secured, near their outer ends, the ropes $j'\ j^2$, which respectively pass over the pulleys J' J², journaled between lugs on the main frame, and extend from said pulleys to lugs on the cam-wheel D, to which lugs the ropes are secured.

By the above means the cam wheel will be rotated a proper distance in one direction by pressing down the treadle H', and a similar distance in the opposite direction by pressing down the treadle H².

$g\ g'$ are stop-lugs on the edge of the cam-wheel, and $h\ h'$ are stop-lugs depending from the bed-plate, which stop-lugs act together to limit the rotation of the cam-wheel in either direction, in the usual well-known manner.

When the treadle H² is pushed down, the rope $j^2$ rotates the cam-wheel in the direction to cause the cross-heads $c$ to move outward in the slots $b$. This outward motion is caused by the inclination across said slots of the slots $a$ and the pins and friction-rollers in the latter slots. The links $f$ then draw the arms $q'$ of the plaiters outward and lift the arm $q$ through the slots $b'$ up against the former. When the treadle H' is depressed, the opposite action is obviously produced and the arms $q$ of the plaiters are turned outwardly through the slots $b'$ to points below the level of the bed-plate.

$n$ is a sleeve moving on the vertical part of the lever E above the former and having an outstanding flange $n'$, notched transversely at points $n^2$, equal in number to that of the former-bars C or plaiters Q. The said notches are, by means of the circumferential grooves $n^3$ in the flange $n'$, converted into seats for the upper ends of the lever-bars $k$, which ends are perforated and threaded on a wire ring that lies in the groove $n^3$ and acts as a pivot for the lever-arms. The lower ends of the lever-arms K are pivoted to the upper ends of the link-arms $l$, the lower ends of which are pivoted to the upstanding lugs of the top plate T of the former. From the outer sides of the links $l$ at proper points stand the punch-points $m$, that enter the perforations $q^3$ in the arms $q^2$ of the plaiters, when the sleeve $n$ is depressed by the following means.

F is a bifurcated lever-handle pivoted at the bifurcated end upon the transverse part of the lever E and with its outer end free. The links G are pivoted upon the bifurcated lever-arm F at their upper ends and at their lower ends to lugs standing upward on opposite sides of the sleeve $n$. By depressing the outer end of the lever-handle it is obvious that the sleeve $n$ will be slid down on the arm pivoted to lever E till it rests upon the plate T of the former. (See Fig. 4.) To raise the sleeve after being so depressed a spring P is secured at one end to the top of the lever E, and has its free end bearing upward on an anti-friction roller $x'$, journaled transversely across the bifurcation of the lever F.

In operation the plaiters are turned outward and downward by the described means below the bed-plate and the former raised sufficiently to pass the circular scored blank X into the recess $o$. When said blank is in position, the plaiters, by means of the treadle H² and other described parts, have their arms $q$ brought upward and inward against the former, carrying with them the outer scored portion of the blank and bending the said scored portion into plaits upon the former. The sleeve $n$ is then slid downward by the described means, bringing the links $l$ horizontal, bending the edge portion of the blank outward on the arms $q^2$ of the plaiters and driving the punch-points in through the perforations $q^3$, which punch-points consequently pass through the outer portions of the plaits in the blank and form outstanding tongues therein, which keep the leaves of the plaits connected. Of course such leaves or plaits can be held together by other suitable means;

but those described are preferred. The sleeve $n$ having been raised, as described, the former is then lifted by the described means, the spring S holding the base-plate Z down for a sufficient time for the former-arms C to be drawn inward by the links $c'$ to a sufficient distance to permit the former to pass out of the contracted portion of the cuspidor which is then to be removed. The formers are inclined to plait the cuspidor inclined from top to bottom, in order that by twisting the formed cuspidor in the direction of the inclination of the plaits it can be reduced in size for transportation.

When the cuspidor is to be of sheet metal, it is preferable to plait the blank radially.

The cuspidor and blank shown in Figs. 8 and 9 form no part of the present invention, the said views and descriptions thereof forming subject-matter of an application of even date of filing herewith. It was, however, necessary to insert said views to render intelligible the operation of the machine and the article it was intended to manufacture.

Having described my invention I claim—

1. In a machine of the class described, the combination of the former vertically movable at the will of the operator, the plaiters, the upper arms of which are pivoted below the upper surface of the bed-plate, and the mechanism by which the said upper arms can be brought to a horizontal position or raised against the former, substantially as specified.

2. In a machine of the described class, the combination, with the laterally contracting and expanding former, and means, substantially as described, whereby the former may be simultaneously raised and laterally contracted to pass out of the formed article, of the plaiters pivoted to the main frame, and mechanism, substantially as described, whereby the upper arms of said plaiters may be at will depressed below the bed-plate of the main frame, or be brought up to carry the blank and bend the plates therein against the former.

3. In a machine of the class described, the combination of the bed-plate provided with suitable radial slots, the vertically-movable former resting on the bed-plate, the double-armed plaiters pivoted to the bed-plate, the cam-wheel partially rotatable in opposite directions and provided with inclined slots equal in number to and crossing the radial slots in the bed-plate at similar points and at equal angles, the cross-heads resting and sliding in the slots in the bed-plate, the pins and their anti-friction rollers depending from the cross-heads and entering the slots in the cam-wheel, and the pivoted links connecting the cross-heads and lower arms of the plaiters, substantially as specified.

4. The combination, with the former, substantially as described, of the plaiters pivoted below the surface of the bed-plate of the main frame at an angle to the plane of the same, causing them, when raised, to be at an inclination with the axis of the former, and the means whereby the upper arms of said plaiters may be brought to a horizontal or raised position against the former, substantially as specified.

5. In a machine of the class described, the combination, with the main frame and the bed-plate provided with the sets of radial slots $b\ b'$, respectively, of the cam-wheel D, journaled on the depending shaft M and provided in its rim with the inclined slots $a$ and partly rotatable in opposite directions, the plaiters pivoted to the bed-plate and provided with the arms $q\ q'$, the cross-heads $c$, moving in the slots $b$, the pins and their anti-friction rollers depending from said cross-heads into the slots $a$, and the links $f$, connecting the cross-heads and lower arms $q'$ of the plaiters, substantially as specified.

6. The combination, with the main frame, the bed-plate, and standard L, rising from the main frame, of the former, composed of the upper plate T, lower plate Z, former-bars C, pivoted at their upper ends to the edge of the plate T, the lever E, pivoted to the standard L and provided with a vertical pivoted arm secured to plates T and Z, the spring S in a recess in the lower end of said lever and bearing down on the plate Z to contract the former, the pedal H, pivoted to the main frame, the pulleys J and K, journaled upon the main frame, and the rope $j$, extending from the treadle H over the pulley J and under the pulley K and with its upper end attached to the lever E, substantially as specified.

7. In a machine of the class described, the combination of the cam-wheel mounted on a shaft depending from the bed-plate of the main frame and rotatable partially in opposite directions with the stop-lugs $h\ h'$ on the bed-plate, the stop-lugs $g\ g'$ on the cam-wheel, the treadle $H'\ H^2$, pivoted to the main frame, the ropes $j'\ j^2$, respectively, connecting said pedals at their lower ends, thence passing respectively over the pulleys $J'\ J^2$, and thence running to the depending lugs of the cam-wheel, to which they are secured, substantially as specified.

8. In a machine of the class described, the combination, with the former of a suitable construction, and the pivoted plaiters having the arms $q^2\ q^2$ extending outward from their upper ends, of the sleeve $n$, sliding on the vertical pivoted arm of the lever E, the lever-arms K, pivoted at their upper ends to said sleeve, the links $l$, pivoted at their upper ends to the lower ends of the lever-arms and at their lower ends to the top of the former, and means, substantially as described, whereby the said sleeve can be moved down to the former and the links $l$ caused to stand horizontally over the arms $q^2$ of the plaiters, substantially as specified.

9. In a machine of the class described, the combination, with the former and the pivoted plaiters having the outwardly-extending horizontal arms $q^2$ extending from their upper ends and provided with perforations $q^3$ near their outer ends, of the links $l$, provided with the punching-points $m$, to enter the perforations $q^3$ when the said links are depressed, and mechanism, substantially as described, whereby said links are forced horizontally over the arms $q^2$, with the punches $m$ entering the perforations $q^3$, as specified.

10. In a machine of the class described, the combination, with the former and the pivoted plaiters having the arms $q^2$ at their upper ends, of the sleeve $n$, sliding on the arm pivoted to lever E, the lever-bars $k$, the links $l$, the lever-handle F, pivoted to the lever E, the links G, connecting said lever-handle with the lugs on opposite sides of the sleeve $n$, the anti-friction roller journaled transversely across the bifurcation, and the spring P, secured at one end to the lever E and with the other end bearing upward against the anti-friction roller, substantially as specified.

In testimony whereof I affix my signature in presence of two witnesses.

CHARLES C. CHAMBERLAIN.

Witnesses:
JOHANNES MULDER,
PAUL VAN DEIUSE.